United States Patent
Choe et al.

(10) Patent No.: US 10,484,930 B2
(45) Date of Patent: Nov. 19, 2019

(54) METHOD AND APPARATUS FOR PERFORMING ACCESS TO CELL

(71) Applicant: LG Electronics Inc., Seoul (KR)

(72) Inventors: Hyunjung Choe, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/257,459

(22) Filed: Jan. 25, 2019

(65) Prior Publication Data

US 2019/0174395 A1 Jun. 6, 2019

Related U.S. Application Data

(63) Continuation of application No. PCT/KR2018/005198, filed on May 4, 2018.

(60) Provisional application No. 62/502,591, filed on May 5, 2017, provisional application No. 62/501,824, filed on May 5, 2017.

(51) Int. Cl.

| | | |
|---|---|---|
| *H04L 12/28* | (2006.01) | |
| *H04W 48/08* | (2009.01) | |
| *H04W 48/10* | (2009.01) | |
| *H04W 48/16* | (2009.01) | |
| *H04W 76/27* | (2018.01) | |
| *H04W 76/10* | (2018.01) | |
| *H04W 8/22* | (2009.01) | |
| *H04W 48/20* | (2009.01) | |
| *H04W 72/04* | (2009.01) | |
| *H04W 72/10* | (2009.01) | |
| *H04J 1/16* | (2006.01) | |
| *H04W 88/06* | (2009.01) | |
| *H04W 76/50* | (2018.01) | |
| *H04W 4/14* | (2009.01) | |

(52) U.S. Cl.
CPC ............. *H04W 48/08* (2013.01); *H04W 8/22* (2013.01); *H04W 48/10* (2013.01); *H04W 48/16* (2013.01); *H04W 48/20* (2013.01); *H04W 72/048* (2013.01); *H04W 72/10* (2013.01); *H04W 76/10* (2018.02); *H04W 76/27* (2018.02); *H04W 4/14* (2013.01); *H04W 76/50* (2018.02); *H04W 88/06* (2013.01)

(58) Field of Classification Search
CPC ...................................................... H04W 72/04
USPC ................................ 370/252, 328, 278, 230
See application file for complete search history.

(56) References Cited

U.S. PATENT DOCUMENTS

| | | | |
|---|---|---|---|
| 2008/0194259 A1* | 8/2008 | Vujcic | H04W 74/0866 455/435.1 |
| 2013/0343319 A1 | 12/2013 | Quan et al. | |
| 2015/0094020 A1 | 4/2015 | Lin et al. | |

(Continued)

FOREIGN PATENT DOCUMENTS

WO    2013184225    12/2013

*Primary Examiner* — John Pezzlo

(74) *Attorney, Agent, or Firm* — Fish & Richardson P.C.

(57) ABSTRACT

Provided are a method for a user equipment (UE) to perform access to a cell in a wireless communication, and an apparatus supporting the same. The method may include: receiving, from a first system, access control information for the first system; camping on the cell of a second system; mapping the access control information for the first system to access control information for the second system; and performing access to the cell of the second system, based on the mapped access control information for the second system.

17 Claims, 12 Drawing Sheets

(56) References Cited

U.S. PATENT DOCUMENTS

| | | | |
|---|---|---|---|
| 2015/0237041 A1 | 8/2015 | Flamini et al. | |
| 2016/0157290 A1* | 6/2016 | Lee | H04W 48/18 370/329 |
| 2017/0064534 A1* | 3/2017 | Loehr | H04W 72/04 |
| 2017/0064601 A1 | 3/2017 | Kubota et al. | |
| 2019/0141515 A1* | 5/2019 | Kim | H04W 76/28 |

* cited by examiner

METHOD AND APPARATUS FOR PERFORMING ACCESS TO CELL

CROSS-REFERENCE TO RELATED APPLICATIONS

Pursuant to 35 U.S.C. § 119(e), this application is a continuation of International Application PCT/KR2018/005198, with an international filing date of May 4, 2018, which claims the benefit of U.S. Provisional Patent Applications Nos. 62/502,591, filed on May 5, 2017 and 62/501,824, filed on May 5, 2017, the contents of which are hereby incorporated by reference herein in its entirety.

BACKGROUND OF THE INVENTION

Field of the Invention

The present invention relates to a wireless communication system, and more particularly, to a method for a user equipment (UE) to perform access to a cell and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE INVENTION

Meanwhile, new 5G NR access category will be applied for access control. As new 5G NR access category will be applied, 4G LTE access control mechanisms cannot be applied for NR without any modification. For example, when the UE is connected to 5G-CN via E-UTRA, the NAS layers of the UE and the AMF that the UE is connected to will exchange NR NAS signaling messages. The serving eNB connected to 5G-CN may need to support enhanced LTE signaling messages or support only LTE messages. The latter may be preferred in order to minimize the modification impact of the eNB serving 5G-CN in that the RRC layers of the UE and the eNB can exchange legacy LTE RRC messages. Here, the issue in the UE is that the NAS layer operation is based on NR protocol and the RRC layer operation is based on LTE protocol. The RRC layer in 4G LTE may require parameters such as establishment cause, call type, EAB indication, or ACDC category from the NAS layer for access control. Therefore, the UE connected to 5G-NAS via E-UTRA may require functionality for compatible operation to translate an access category into one or more LTE access control parameters. Hereinafter, a method for a UE to perform access to a cell and an apparatus supporting the same according to an embodiment of the present invention are described in detail.

One embodiment provides a method for performing, by a user equipment (UE), access to a cell in a wireless communication. The method may include: receiving, from a first system, access control information for the first system; camping on the cell of a second system; mapping the access control information for the first system to access control information for the second system; and performing access to the cell of the second system, based on the mapped access control information for the second system.

Another embodiment provides a user equipment (UE) performing access to a cell in a wireless communication. The UE may include: a memory; a transceiver; and a processor, connected to the memory and the transceiver, that: controls the transceiver to receive, from a first system, access control information for the first system; camps on the cell of a second system; maps the access control information for the first system to access control information for the second system; and performs access to the cell of the second system, based on the mapped access control information for the second system.

A UE can perform access control without signaling modification among the UE, the base station and the core network.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
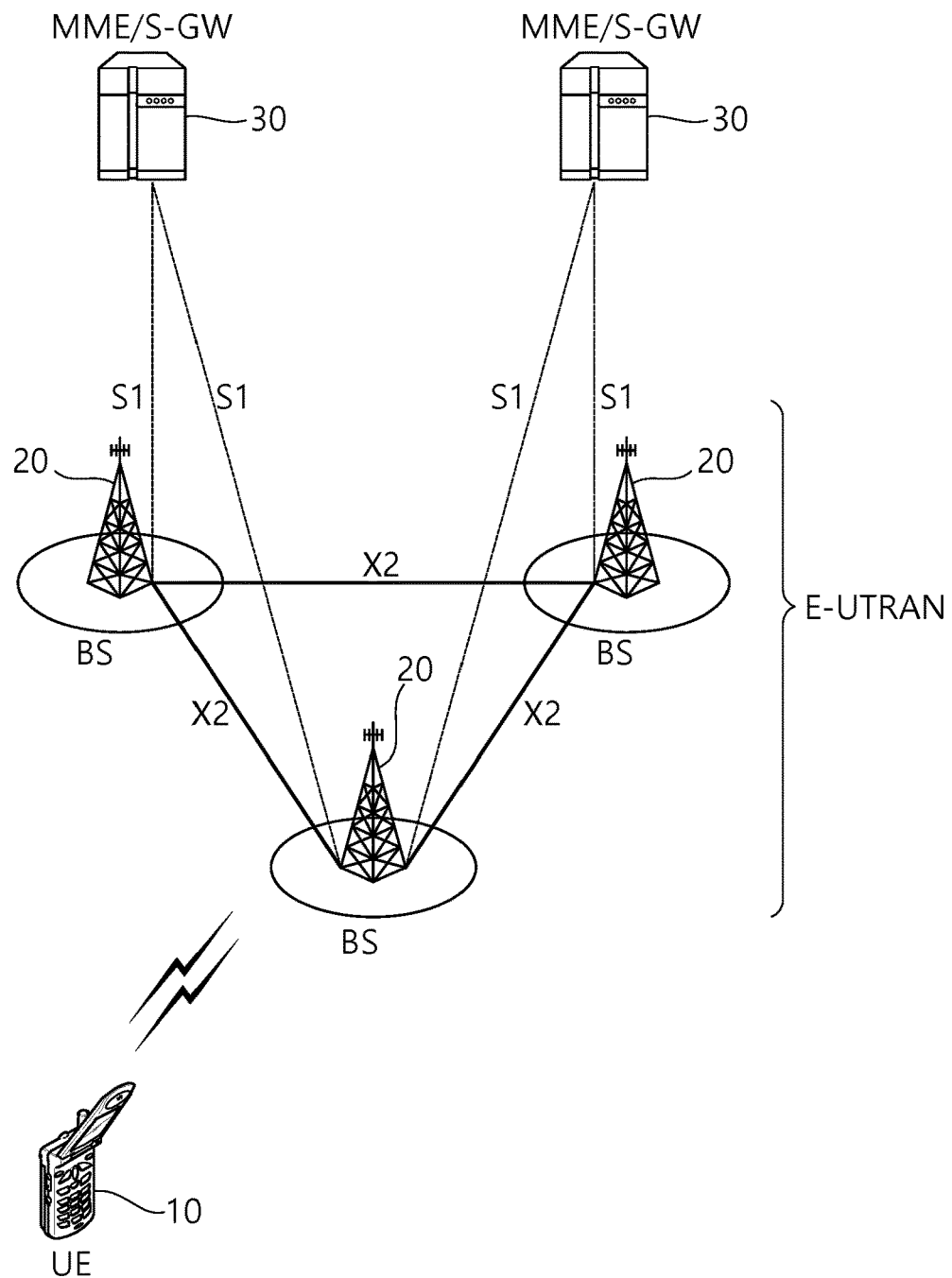
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
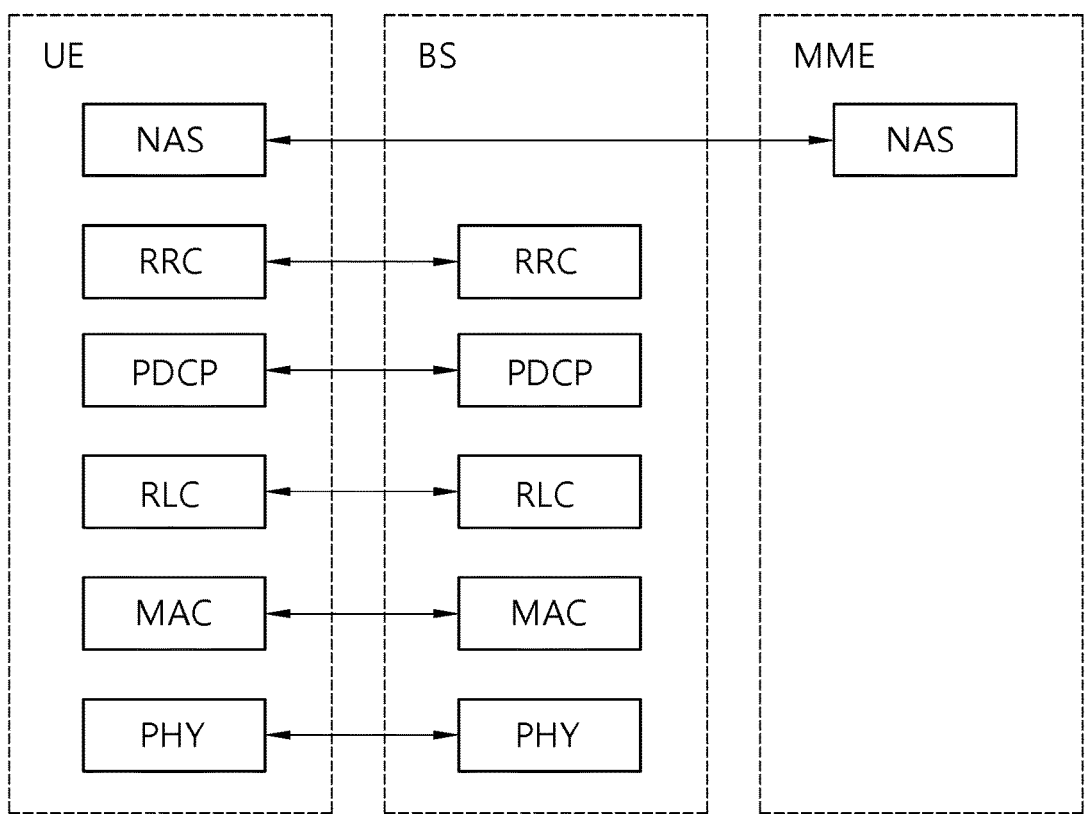
FIG. 2 shows a control plane of a radio interface protocol of an LTE system.
Figure 3:
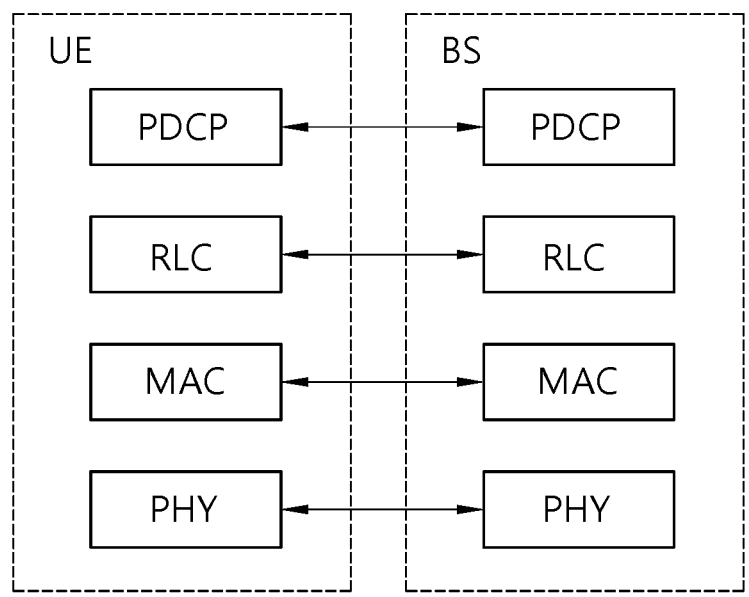
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
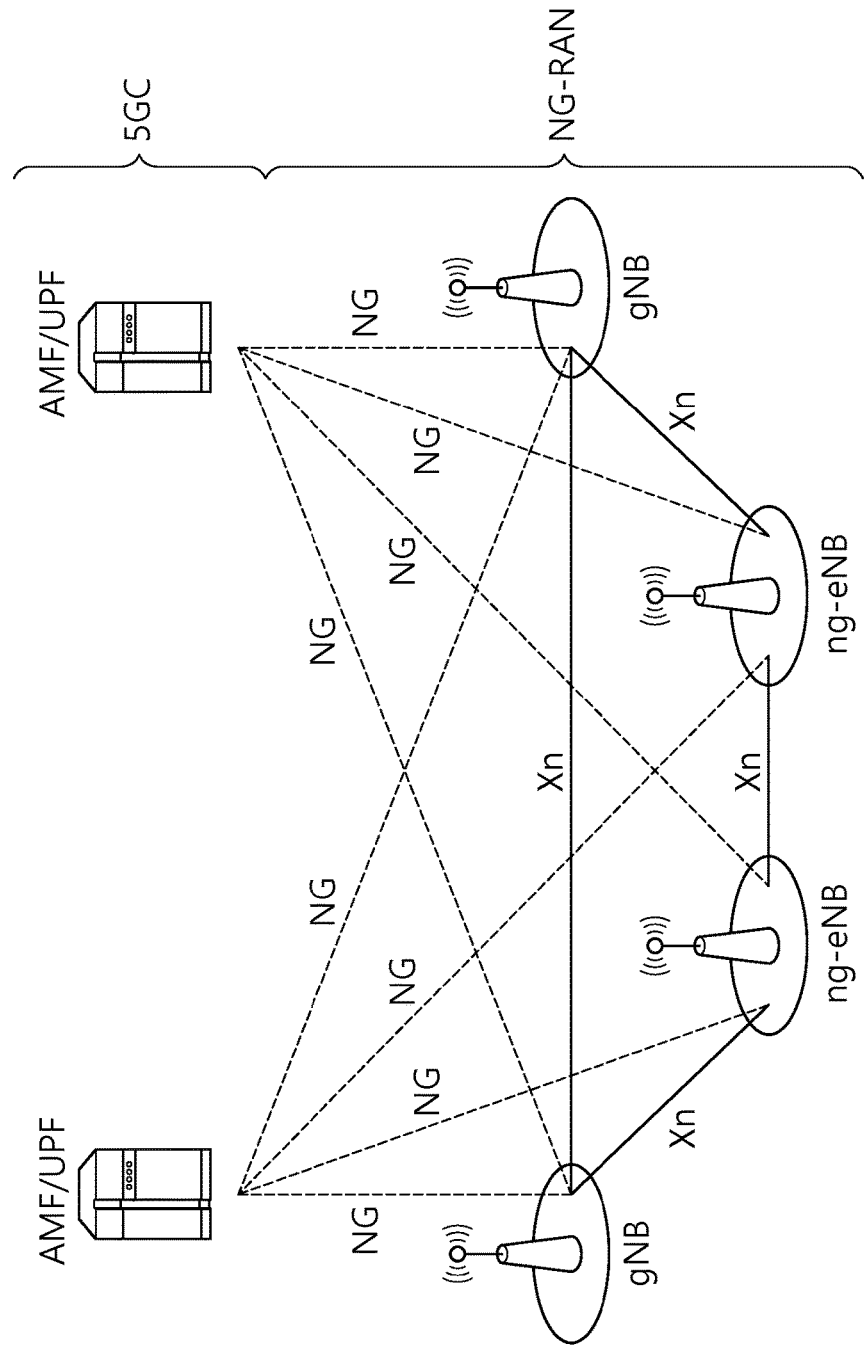
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and 5GC, and the NG-U may be user plane interface between NG-RAN and 5GC.

Figure 5:
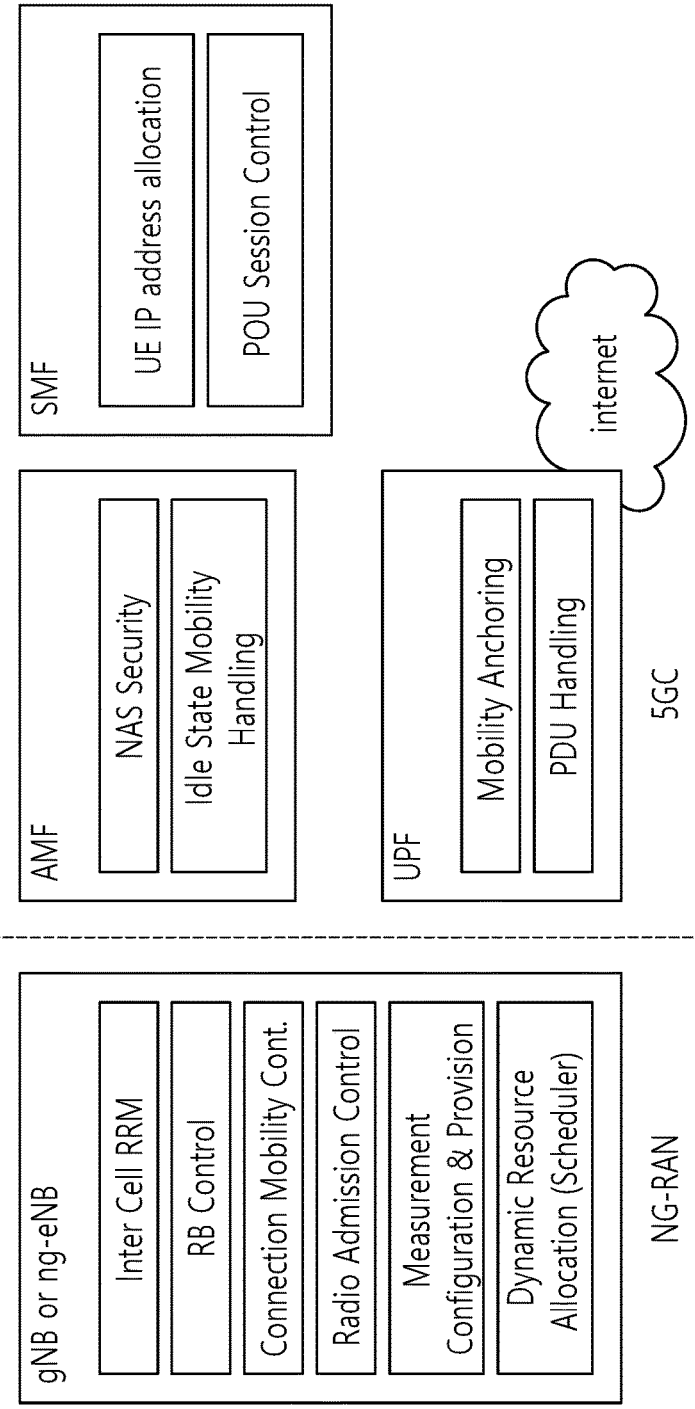
FIG. 5 shows functional split between NG-RAN and 5GC

FIG. 5 shows functional split between NG-RAN and 5GC

Referring to FIG. 5, the gNB and ng-eNB may host the following functions:
 Functions for Radio Resource Management: Radio Bearer Control, Radio Admission Control, Connection Mobility Control, Dynamic allocation of resources to UEs in both uplink and downlink (scheduling);
 IP header compression, encryption and integrity protection of data;
 Selection of an AMF at UE attachment when no routing to an AMF can be determined from the information provided by the UE;
 Routing of User Plane data towards UPF(s);
 Routing of Control Plane information towards AMF;
 Connection setup and release;
 Scheduling and transmission of paging messages;
 Scheduling and transmission of system broadcast information (originated from the AMF or O&M);
 Measurement and measurement reporting configuration for mobility and scheduling;
 Transport level packet marking in the uplink;
 Session Management;
 Support of Network Slicing;
 QoS Flow management and mapping to data radio bearers;
 Support of UEs in RRC_INACTIVE state;
 Distribution function for NAS messages;
 Radio access network sharing;
 Dual Connectivity;
 Tight interworking between NR and E-UTRA.

The Access and Mobility Management Function (AMF) may host the following main functions:
 NAS signalling termination;
 NAS signalling security;
 AS Security control;
 Inter CN node signalling for mobility between 3GPP access networks;
 Idle mode UE Reachability (including control and execution of paging retransmission);
 Registration Area management;
 Support of intra-system and inter-system mobility;
 Access Authentication;
 Access Authorization including check of roaming rights;
 Mobility management control (subscription and policies);
 Support of Network Slicing;
 SMF selection.

The User Plane Function (UPF) may host the following main functions:
 Anchor point for Intra-/Inter-RAT mobility (when applicable);
 External PDU session point of interconnect to Data Network;
 Packet routing & forwarding;
 Packet inspection and User plane part of Policy rule enforcement;
 Traffic usage reporting;
 Uplink classifier to support routing traffic flows to a data network;
 Branching point to support multi-homed PDU session;
 QoS handling for user plane, e.g. packet filtering, gating, UL/DL rate enforcement;
 Uplink Traffic verification (SDF to QoS flow mapping);
 Downlink packet buffering and downlink data notification triggering.

The Session Management function (SMF) may host the following main functions:
 Session Management;
 UE IP address allocation and management;
 Selection and control of UP function;
 Configures traffic steering at UPF to route traffic to proper destination;
 Control part of policy enforcement and QoS;
 Downlink Data Notification.

Figure 6:
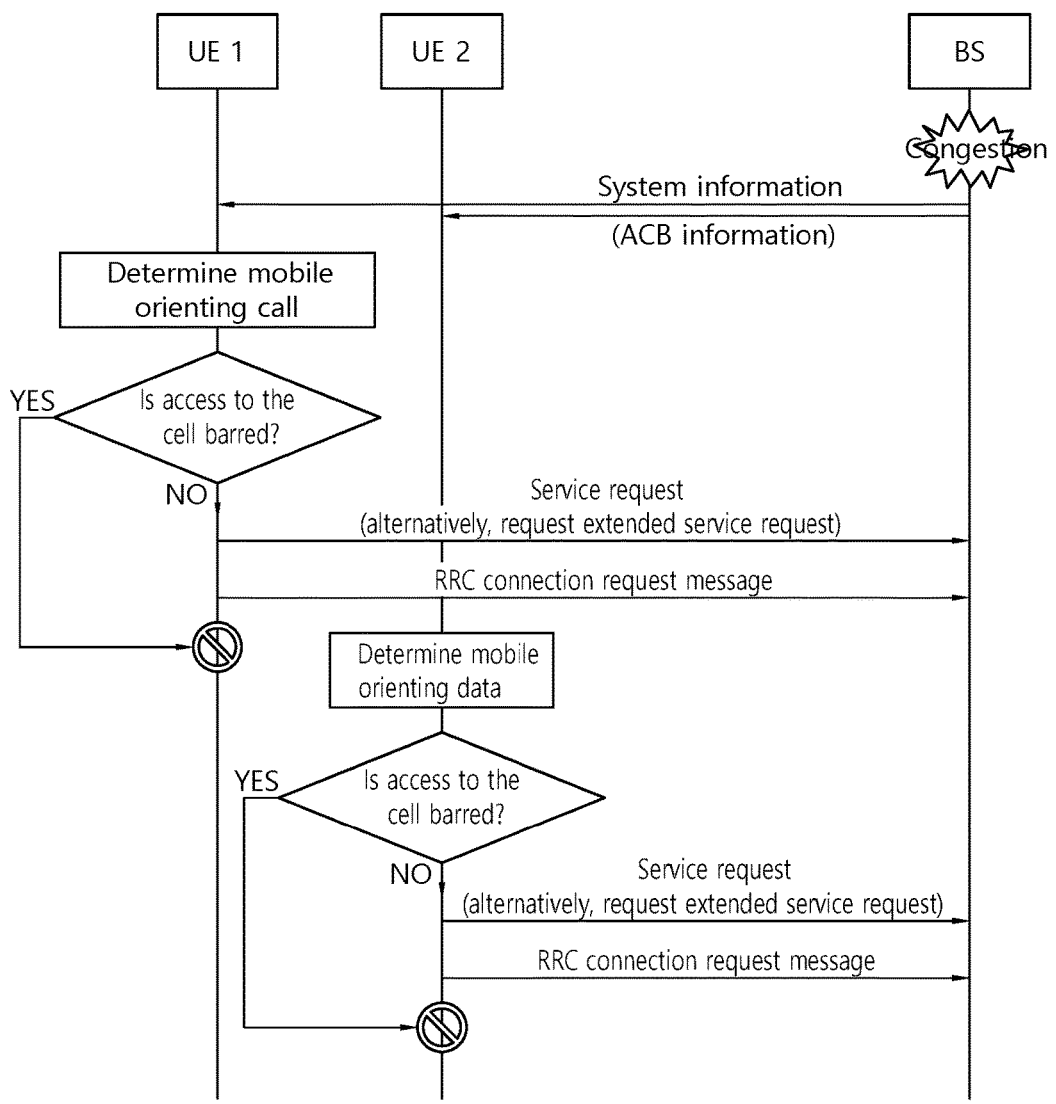
FIG. 6 shows an example of access barring check.

FIG. 6 shows an example of access barring check.

Referring to FIG. 6, in the overload or congest state of the network or the base station, the base station may broadcast access class barring (ACB)-related information through system information. The system information may be system information block (SIB) type 2.

The SIB type 1 may include ACB-related information like the following table.

TABLE 1

| Field | Description |
| --- | --- |
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 may determine an IMS service, for example, mobile orienting of a call by VoLTE and generates a service request message. Similarly, UE2 may determine mobile orienting of general data and generate the service request message.

Sequentially, the UE1 may generate an RRC connection request message. Similarly, the UE2 may generate the RRC connection request message.

Meanwhile, the UE1 may perform access barring check (that is, whether the ACB is applied). Similarly, the UE2 may perform access barring check (that is, whether the ACB is applied).

If the ACB is not applied, the UE1 and the UE2 may transmit the RRC connection request message, respectively. However, when the ACB is applied, both the UE1 and the UE2 may not transmit the RRC connection request message, respectively.

The access barring check will be described in detail as follows. Generally, at least one of 10 access classes (for example, AC0, AC1, . . . , and AC9) may be randomly allocated to the UE. Exceptionally, for urgent emergency access, AC10 is allocated. As such, the value of the randomly allocated access class may be stored in each USIM of the UE1 and the UE2. Then, the UE1 and the UE2 may verify whether the access barring is applied, by using a barring factor included in the received ACB-related information, based on the stored access class. The access barring check may be performed in each access stratum (AS) layer, that is, an RRC layer of the UE1 and the UE2.

The access barring check will be described in more detail as follows.

The ac-BarringPerPLMN-List may be included in the SIB type 2 received by each of the UE1 and the UE2, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 and the UE2 perform the RRC connection request, the access barring check may be performed by using T303 as Tbarring and using ac-BarringForMO-Data as a barring parameter.

When the barring is determined, each AS(RRC) layer of the UE1 and the UE2 may notify a failure of the RRC connection establishment to the higher layer.

Subsequently, as such, when the access is barred, each AS(RRC) layer may determine whether a T302 timer or a Tbarring timer is running. If the timer is not running, the T302 timer or the Tbarring timer may be run.

Meanwhile, while the T302 timer or a Tbarring timer is running, the AS(RRC) layer considers that all the access to the corresponding cell is barred.

As described above, in the network overload and congest situation, the base station may provide the ACB-related information to the UE. Then, the UE may check whether access to the cell is barred by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the base station.

Meanwhile, the access barring check may perform general mobile originating (MO) services of the UE, for example, originating call, originating data, originating IMS voice, and originating IMS video. That is, the ACB may be applied to access of all application programs (but, except for a response to an emergency service or paging).

As a method of differentiating a normal mobile originating (MO) service, for example, originating call, originating data, originating IMS voice, and originating IMS video, it is proposed application specific congestion control for data communication (ACDC).

Figure 7:
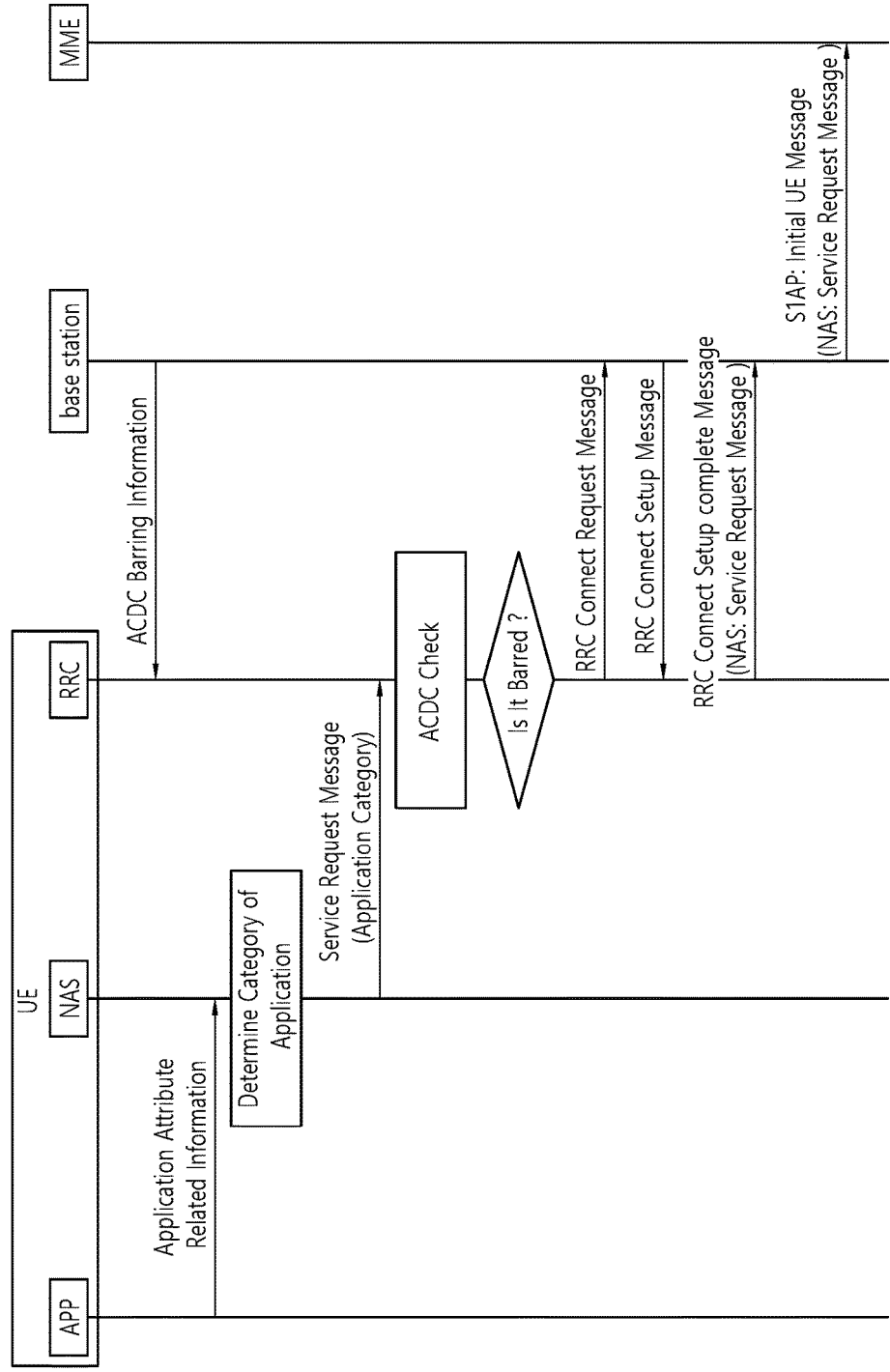
FIG. 7 shows an example of access barring check for Application specific Congestion control for Data Communication (ACDC).

FIG. 7 shows an example of access barring check for Application specific Congestion control for Data Communication (ACDC).

Referring to FIG. 7, firstly, a base station may provide ACDC barring information to a UE through SIB.

Meanwhile, when a specific application is executed in a UE and a data communication service is required by the specific application, an application layer for controlling execution of the specific application may provide application attribute related information to an NAS layer.

Then, on the basis of the application attribute related information received from the application layer, the NAS layer of the UE may determine an application category for the ACDC.

Subsequently, when starting a service request procedure for a service connection (transmission of a service request message or transmission of an extended service request message), the NAS layer of the UE may deliver information regarding the application category to an AS layer (i.e., RRC layer).

Before performing the service request procedure of the NAS layer (transmission of the service request message or transmission of an extended service request message), on the basis of the application category and ACDC barring information received from the network, the AS layer (e.g., RRC layer) of the UE may perform ACDC barring check and thus determines whether to allow or not allow the service request procedure.

If it is determined not to be barred but to be allowed as a result of the ACDC barring check, the AS layer (i.e., RRC layer) of the UE may transmit an RRC connection request message to the base station.

As described above, a service request required by an application currently being executed in the UE through the ACDC may be allowed or barred through differentiation.

Meanwhile, NG-RAN may support overload and access control functionality such as RACH back off, RRC Connection Reject, RRC Connection Release and UE based access barring mechanisms. One unified access control framework may be applied for NR. For each identified access attempt one Access Category and one or more Access Identities may be selected. NG-RAN may broadcast barring control information associated with Access Categories and Access Identities and the UE may determine whether an identified access attempt is authorized or not, based on the broadcasted barring information and the selected Access Category and Access Identities. In the case of multiple core networks sharing the same NG-RAN, the NG-RAN provides broadcasted barring control information for each PLMN individually. The unified access control framework may be applicable to all UE states. The UE states may include RRC_IDLE, RRC_INACTIVE or RRC_CONNECTED state. In RRC_IDLE, the UE NAS informs RRC of the access category and the Connection Request includes some information to enable the gNB to decide whether to reject the request.

Based on operator's policy, the 5G system shall be able to prevent UEs from accessing the network using relevant barring parameters that vary depending on Access Identity and Access Category. Access Identities are configured at the UE as listed in Table 2. Any number of these Access Identities may be barred at any one time.

TABLE 2

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

(NOTE 1) Access Identity 1 is used by UEs configured for MPS, in the PLMNs where the configuration is valid. The PLMNs where the configuration is valid are HPLMN, PLMNs equivalent to HPLMN, visited PLMNs of the home country, and configured visited PLMNs outside the home country.
(NOTE 2) Access Identity 2 is used by UEs configured for MCS, in the PLMNs where the configuration is valid. The PLMNs where the configuration is valid are HPLMN or PLMNs equivalent to HPLMN.
(NOTE 3) Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

Access Categories are defined by the combination of conditions related to UE and the type of access attempt as listed in Table 3. Access Category 0 shall not be barred, irrespective of Access Identities. The network can control the amount of access attempts relating to Access Category 0 by controlling whether to send paging or not.

TABLE 3

| Access Category number | Conditions related to UE | Type of access attempt |
| --- | --- | --- |
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice(NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8-31 | | Reserved standardized Access Categories |
| 32-63 (NOTE 2) | All | Based on operator classification |

(NOTE 1) The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
(NOTE 2) When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
(NOTE 3) Includes Real-Time Text (RTT).
(NOTE 4) Includes IMS Messaging.

One or more Access Identities and only one Access Category are selected and tested for an access attempt. The 5G network shall be able to broadcast barring control information (i.e. a list of barring parameters associated with an Access Identity and an Access Category) in one or more areas of the RAN. The UE shall be able to determine whether or not a particular new access attempt is allowed based on barring parameters that the UE receives from the broadcast barring control information and the configuration in the UE. In the case of multiple core networks sharing the same RAN, the RAN shall be able to apply access control for the different core networks individually. The unified access control framework shall be applicable both to UEs accessing the 5G CN using E-UTRA and to UEs accessing the 5G CN using NR.

As described above, new 5G NR access category will be applied for access control. As new 5G NR access category will be applied, 4G LTE access control mechanisms cannot be applied for NR without any modification. When the UE is connected to 5G-CN via E-UTRA, the NAS layers of the UE and the AMF that the UE is connected to will exchange NR NAS signaling messages. The serving eNB connected to 5G-CN may need to support enhanced LTE signaling messages or support only LTE messages. The latter may be preferred in order to minimize the modification impact of the eNB serving 5G-CN in that the RRC layers of the UE and the eNB can exchange legacy LTE RRC messages. Here, the issue in the UE is that the NAS layer operation is based on NR protocol and the RRC layer operation is based on LTE protocol. The RRC layer in 4G LTE may require parameters such as establishment cause, call type, EAB indication, or ACDC category from the NAS layer for access control. Therefore, the UE connected to 5G-NAS via E-UTRA may require functionality for compatible operation to translate an access category into one or more LTE access control parameters.

In the opposite case, the same problem may occur. When the UE is connected to 4G-CN via serving gNB, the NAS layers of the UE and the MME that the UE is connected to will exchange LTE NAS signaling messages. Here, the issue in the UE is that the NAS layer operation is based on LTE protocol and the RRC layer operation is based on NR protocol. The RRC layer in 5G may require access categories from the NAS layer for access control. Therefore, the UE connected to 4G-NAS via serving gNB may require functionality for compatible operation to translate one or more LTE access control parameters into one or more access categories. That is, for both NR and eLTE, the mapping between access categories/access identities and establishment cause value may be needed.

Hereinafter, a method for a UE to perform access to a cell and an apparatus supporting the same according to an embodiment of the present invention are described in detail. According to an embodiment of the present invention, the UE may access the 5G-CN using E-UTRA. For example, the 5G-CN may include AMF, and the E-UTRA may include eNB. Alternatively, according to an embodiment of the present invention, the UE may access the 4G-CN using NR node. For example, the 4G-CN may include MME, and the NR node may include gNB.

The UE connected to 5G-CN may exchange 5G NAS signalling messages with the AMF no matter the serving node is the eNB or the gNB. Similarly, the UE connected to 4G-CN may exchange 4G NAS signalling messages with the MME no matter the serving node is the eNB or the gNB. According to an embodiment of the present invention, if the serving node is the eNB, the eNB and the UE may exchange LTE RRC messages for access control. On the other hand, if the serving node is the gNB, the gNB and the UE may exchange NR RRC messages for access control. In this way, the modification impact in the UE and eNB serving 5G-CN or gNB serving 4G-CN can be minimized. The UE RRC only concerns the connected serving node (e.g., whether the connected serving node is eNB using LTE signalling or gNB using NR signalling) and the UE NAS layer only concerns the RAT information of the core network (e.g., whether the core network is 4G-CN or 5G-CN). Thus, no modification between the UE and the eNB may be required to support access control, and no modification may be required for the eNB connected to 5G-CN. To support this, the UE may maintain a mapping table for parameter conversion from NR access control parameters into LTE access control parameters to support LTE access control mechanisms. For example, the LTE access control mechanisms includes at least one of ACB, Extended Access Barring (EAB), Service Specific Access Control (SSAC) or ACDC. Similarly, no modification between the UE and the gNB may be required to support access control, and no modification may be required for the gNB connected to 4G-CN. To support this, the UE may maintain a mapping table for parameter conversion from LTE access control parameters into NR access control parameters to support NR access control mechanisms. For example, the NR access control mechanisms includes the access categories.

Figure 8:
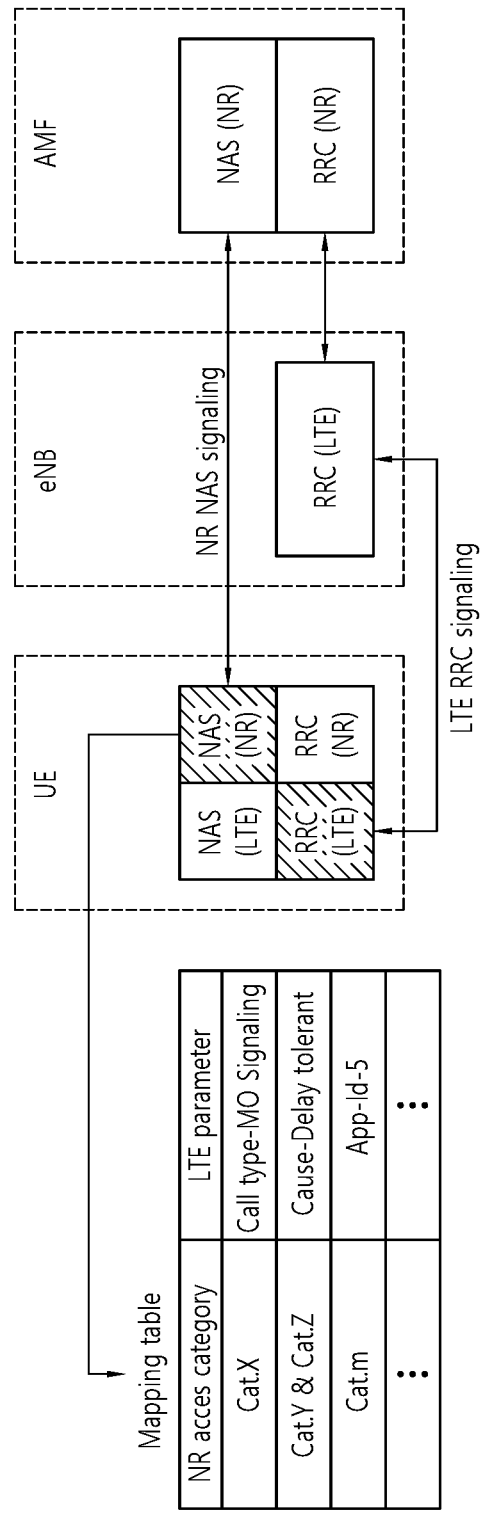
FIG. 8 is a block diagram illustrating access control mechanism for a UE connected to 5G-CN via E-UTRA according to an embodiment of the present invention.

FIG. 8 is a block diagram illustrating access control mechanism for a UE connected to 5G-CN via E-UTRA according to an embodiment of the present invention.

Referring to FIG. 8, the UE may maintain a mapping table for parameter conversion from NR access control parameters into LTE access control parameters to support LTE access control mechanisms. The mapping table is maintained in a NAS layer of the UE.

In first step, the UE may camp on a cell of a first system (or a first RAT). The UE may receive barring information from the first system. The first system (or the first RAT) may be LTE system. The barring information may include at least one of barring factor, barring time or bitmap.

In second step, if access to the cell is initiated for an NR access category for the LTE system, the UE may convert the NR access category into one or more LTE access control parameters based on the mapping table. The LTE access control parameters may include at least one of establishment cause, call type, EAB indication or ACDC categories. The NR access categories may be defined by the combination of conditions related to the UE and the type of access attempt as listed in Table 3. For example, the UE may map one or more NR access categories to one or more LTE access control parameters by using the mapping table. For example, the mapping table may be received from the LTE system or the NR system, and then the mapping table may be stored by the UE. For example, the mapping table may be preconfigured by the UE.

In third step, the UE may determine whether or not access to the cell is barred by using the one or more LTE access control parameters and the barring information. The one or more LTE access control parameters may be converted, mapped or generated from the one or more NR access categories, based on the mapping table.

Alternatively, if the UE camps on a cell of a second system (or a second RAT), and if access to the cell is initiated for the NR access category for the second system (or the second RAT), the UE does not convert the NR access category into one or more LTE access control parameters based on the mapping table. The second system (or the second RAT) may be NR system. Thus, the UE may determine whether or not access to the cell is barred by using one or more NR access categories and the barring information, without using the mapping table.

In fourth step, if access to the cell is not barred, the UE may request the access to the cell.

For example, the following LTE access control mechanisms shall be supported when the UE is connected to 5G-CN via E-UTRA.

According to an embodiment of the present invention, the UE may perform Access Class Barring (ACB) based on barring information received in SIB2. The UE RRC layer may check if the access is allowed for a cell, when the UE performs RRC connection establishment. For this, the UE NAS layer shall provide call type (i.e. MO signalling, emergency call) for the UE RRC layer maps it into RRC establishment cause. The parameter(s) provided by NAS may be converted to call type and establishment cause to support ACB. The parameter(s) provided by NAS may be one or more NR access categories.

According to an embodiment of the present invention, the network operator may perform EAB to UEs configured for EAB for network overload control such that the network can restrict access the UEs when congestion occurs. The parameter(s) provided by NAS may be converted to EAB indication to support EAB. The parameter(s) provided by NAS may be one or more NR access categories.

According to an embodiment of the present invention, ACDC may prevent access attempts from a particular application. The parameter(s) provided by NAS may be converted to ACDC category to support ACDC. The parameter(s) provided by NAS may be one or more NR access categories.

According to an embodiment of the present invention, the UE configured for NAS signalling low priority may indicate it when the UE performs RRC connection establishment or RRC resume. When the network rejects the request, the network may send timer so that the UE cannot attempt access for a given time. The parameter(s) provided by NAS may be converted to call type to support delay tolerant access. The parameter(s) provided by NAS may be one or more NR access categories.

According to an embodiment of the present invention, E-UTRAN may support SSAC for IMS telephony services (i.e., MMTEL). If the UE determines the barring status in the IMS engine and the IMS engine supports SSAC for 5G, SSAC shall be supported regardless of the serving node. If IMS engine supports legacy SSAC operation for 5G, SSAC will be supported without any impact on RRC.

Since the NAS layer will provide NR access category information to the RRC layer in NR and most LTE access control mechanisms are performed based on NAS information, the NAS layer may maintain the mapping table.

Figure 9:
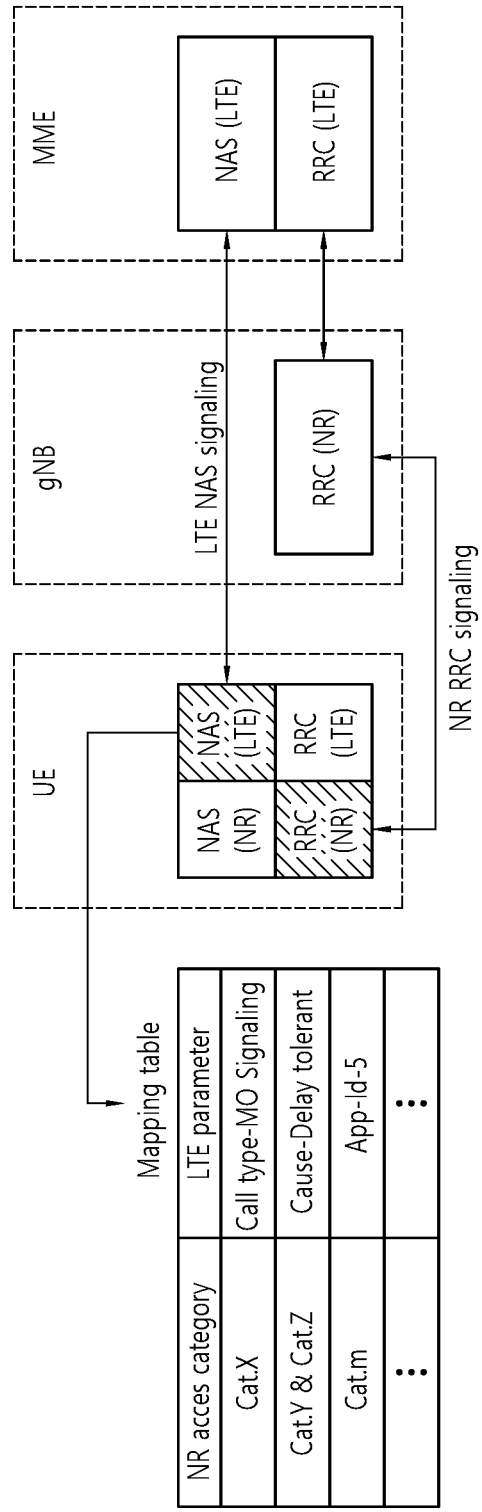
FIG. 9 is a block diagram illustrating access control mechanism for a UE connected to 4G-CN via NR Radio Access (NR) according to an embodiment of the present invention.

FIG. 9 is a block diagram illustrating access control mechanism for a UE connected to 4G-CN via NR Radio Access (NR) according to an embodiment of the present invention.

Referring to FIG. 9, the UE may maintain a mapping table for parameter conversion from LTE access control parameters into NR access control parameters to support NR access control mechanisms. The mapping table is maintained in a NAS layer of the UE.

In first step, the UE may camp on a cell of a second system (or a second RAT). The UE may receive barring information from the second system. The second system (or the second RAT) may be NR system. The barring information may include at least one of barring factor, barring time or bitmap.

In second step, if access to the cell is initiated for an LTE access control parameter for the NR system, the UE may convert the LTE access control parameter into one or more NR access categories based on the mapping table. The LTE access control parameters may include at least one of establishment cause, call type, EAB indication or ACDC categories. The NR access categories may be defined by the combination of conditions related to the UE and the type of access attempt as listed in Table 3. For example, the UE may map one or more LTE access control parameters to one or more NR access categories by using the mapping table. For example, the mapping table may be received from the LTE system or the NR system, and then the mapping table may be stored by the UE. For example, the mapping table may be pre-configured by the UE.

In third step, the UE may determine whether or not access to the cell is barred by using the one or more NR access categories and the barring information. The one or more NR access categories may be converted, mapped or generated from the one or more LTE access control parameters, based on the mapping table.

Alternatively, if the UE camps on a cell of a first system (or a first RAT), and if access to the cell is initiated for the LTE access control parameter for the first system (or the first RAT), the UE does not convert the LTE access control parameter into one or more NR access categories based on the mapping table. The first system (or the first RAT) may be LTE system. Thus, the UE may determine whether or not access to the cell is barred by using one or more LTE access control parameters and the barring information, without using the mapping table.

In fourth step, if access to the cell is not barred, the UE may request the access to the cell.

Figure 10:
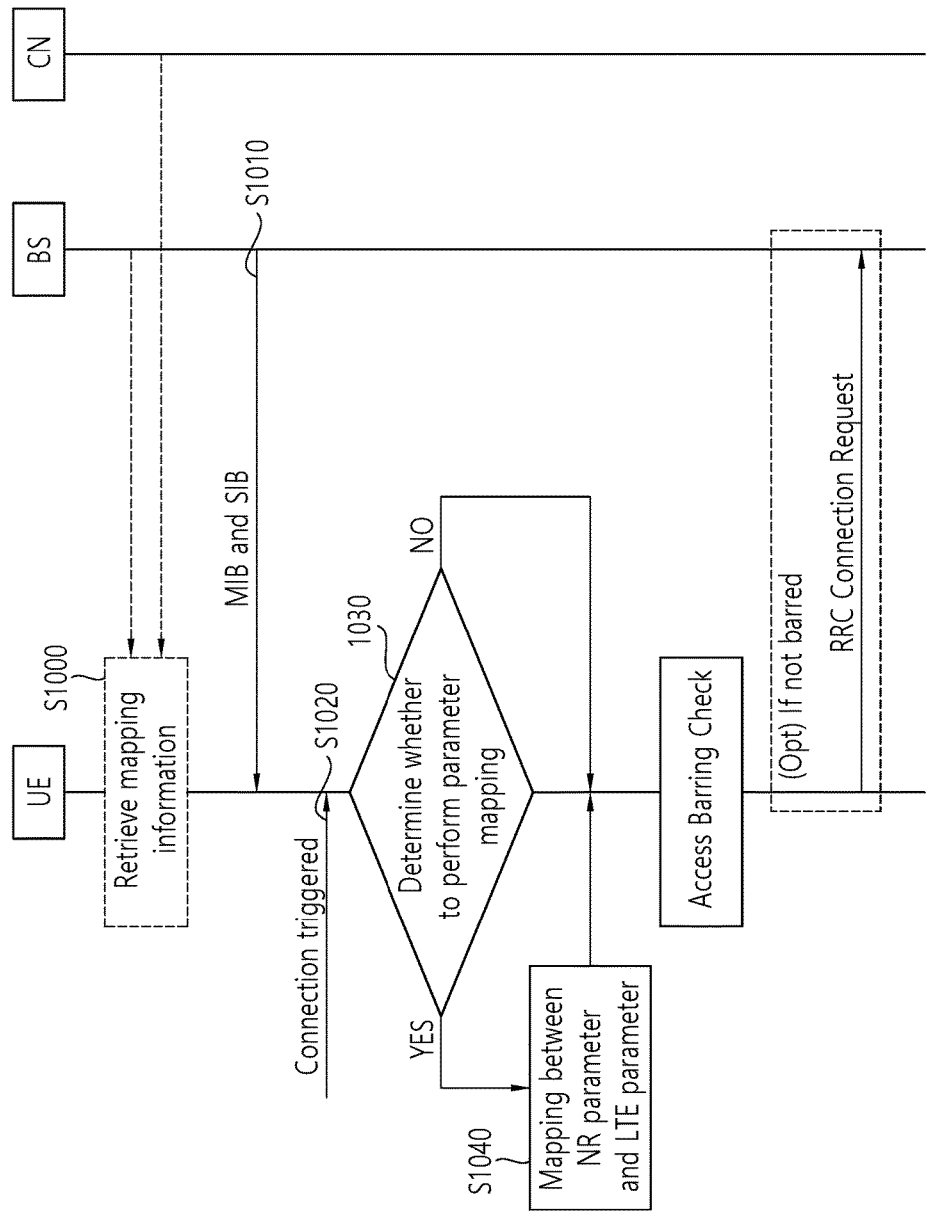
FIG. 10 is a flow chart illustrating access control mechanism of a UE according to an embodiment of the present invention.

FIG. 10 is a flow chart illustrating access control mechanism of a UE according to an embodiment of the present invention.

Referring to FIG. 10, in step S1000, the UE may retrieves a mapping table from a Subscriber identification module (SIM) card or non-volatile memory. The mapping table may be pre-configured by the UE. The mapping table may be configured from the network. For example, the network may include NR system and LTE system. The mapping table is for converting or mapping 5G NR parameters into 4G LTE parameters. The mapping table is for converting or mapping 4G LTE parameters into 5G NR parameters. Even if the mapping table is pre-configured by the UE, the UE can receive the mapping table from the network. In this case, if there exists pre-configured mapping table in step S1000 and same parameters exist, the values received from the network has priority. For example, the UE may be configured as a machine type communication (MTC) device.

In step S1010, the UE may apply MIB, SIBs and SI messages. The RRC layer of the UE may store information for access control as well as other functionalities.

In step S1020, the UE may trigger mobile originated signalling.

In step S1030, the UE may determine whether or not to perform parameter conversion (or parameter mapping).

If the UE determines to perform parameter conversion (or parameter mapping), in step S1040, the UE converts or maps between 4G LTE parameters and 5G NR parameters using the mapping table. For NAS triggered events, UE NAS may perform the mapping to AS cause value when UE NAS makes a request to UE AS for access. Further, the UE NAS may also provide cause value for AS triggered events. At least one LTE establishment cause value, such as emergency, highPriorityAccess, mt-Access, mo-Signalling, mo-Data, or mo-VoiceCall-v1280, may be reused for NR.

If the UE determines not to perform parameter conversion (or parameter mapping), the UE does not convert or map between 4G LTE parameters and 5G NR parameters.

For example, in case of the UE connecting to 5G-CN via E-UTRA, the UE may convert or map NR access control parameter 'access category=2' into LTE parameters 'establishment cause=MO signalling, call type=originating signalling' using the mapping table. Then, if the UE is allowed to attempt access, the UE may send a RRC connection establishment request message indicating 'establishment cause=MO signalling'.

For example, in case of the UE connecting to 5G-CN via E-UTRA, the UE may convert or map NR access control parameter 'access category=4, access category=6' into LTE parameters 'establishment cause=Delay tolerant, call type=originating signalling' using the mapping table. Then, if the UE is allowed to attempt access, the UE may request a RRC connection establishment message indicating 'establishment cause=Delay tolerant'. If the request of the UE is rejected with extendedWaitTime, the RRC layer of the UE may forward the extendedWaitTime to the NAS layer of the UE, and also inform about the failure.

For example, in case of the UE connecting to 4G-CN via NG-RAN, the UE may convert or map LTE parameters 'establishment cause=MO signalling, call type=originating signalling' into NR access control parameter 'access category=2' using the mapping table. Then, if the UE is allowed to attempt access, the UE may send a RRC connection establishment request message indicating 'access category=2'.

For example, in case of the UE connecting to 4G-CN via NG-RAN, the UE may convert or map LTE parameters 'establishment cause=Delay tolerant, call type=originating signalling' into NR access control parameter 'access category=4, access category=6' using the mapping table. Then, if the UE is allowed to attempt access, the UE may request a RRC connection establishment message indicating 'access category=4, access category=6'. If the request of the UE is rejected with extendedWaitTime, the RRC layer of the UE may forward the extendedWaitTime to the NAS layer of the UE, and also inform about the failure.

For example, in case of the UE connecting to 5G-CN via E-UTRA, it is assumed that the UE performs inter-RAT handover and connects to 4G-CN via E-UTRA. If the UE triggers mobile originated signalling, the UE needs not refer the mapping table, because NAS layer will provide LTE parameters. Then, the UE checks access barring and requests RRC connection establishment message if allowed.

Figure 11:
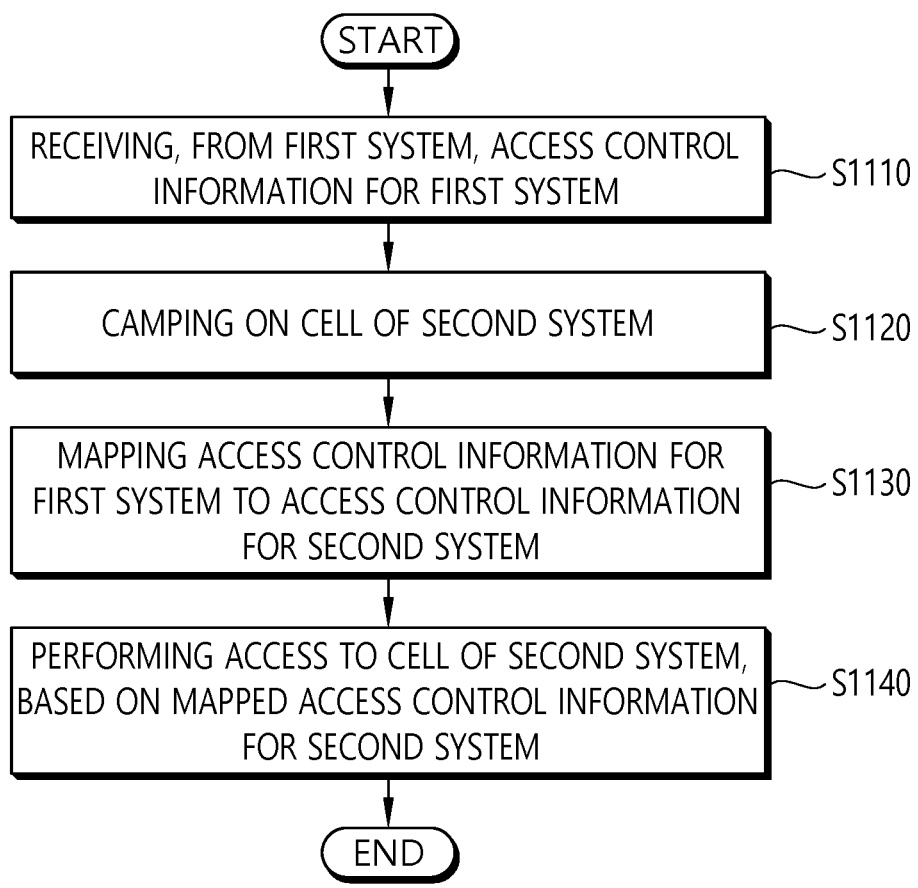
FIG. 11 is a block diagram illustrating a method for a UE to perform access to a cell according to an embodiment of the present invention.

FIG. 11 is a block diagram illustrating a method for a UE to perform access to a cell according to an embodiment of the present invention.

Referring to FIG. 11, in step S1110, the UE may receive, from a first system, access control information for the first system. The access control information for the first system may be provided by a non-access stratum (NAS) layer of the UE. The UE may connect with a core network of the first system, via a base station of the second system.

In step S1120, the UE may camp on the cell of a second system.

In step S1130, the UE may map the access control information for the first system to access control information for the second system. The access control information for the first system may include at least one NR access category. The access control information for the second system may include at least one of establishment cause, call type, extended access barring (EAB) indicator or Application specific Congestion control for Data Communication (ACDC) categories.

Additionally, the UE may configure a mapping table for mapping the access control information for the first system to the access control information for the second system. The access control information for the first system may be mapped, by a non-access stratum (NAS) layer of the UE, to the access control information for the second system, based on the configured mapping table. The mapping table may be pre-configured by the UE. The mapping table may be received from the first system or the second system. The mapping table received from the first system or the second system may have higher priority than the mapping table pre-configured by the UE.

Additionally, the UE may receive, from the second system, barring information including at least one of barring factor, barring time or bitmap.

In step S1140, the UE may perform access to the cell of the second system, based on the mapped access control information for the second system. The access to the cell of the second system may be performed based on the mapped access control information for the second system, if the access to the cell of the second system is not barred.

The first system may be NR radio access (NR) system, and the second system may be long-term evolution (LTE) system. Alternatively, the first system may be long-term evolution (LTE) system, and the second system may be NR radio access (NR) system.

According to an embodiment of the present invention, the UE may map between one or more NR access categories and one or more LTE access control parameters by using the mapping table. Thus, in case of the UE connecting to 5G-CN via E-UTRA or the UE connecting to 4G-CN via NG-RAN, the UE can perform access control without signaling modification among the UE, the base station and the core network.

Figure 12:
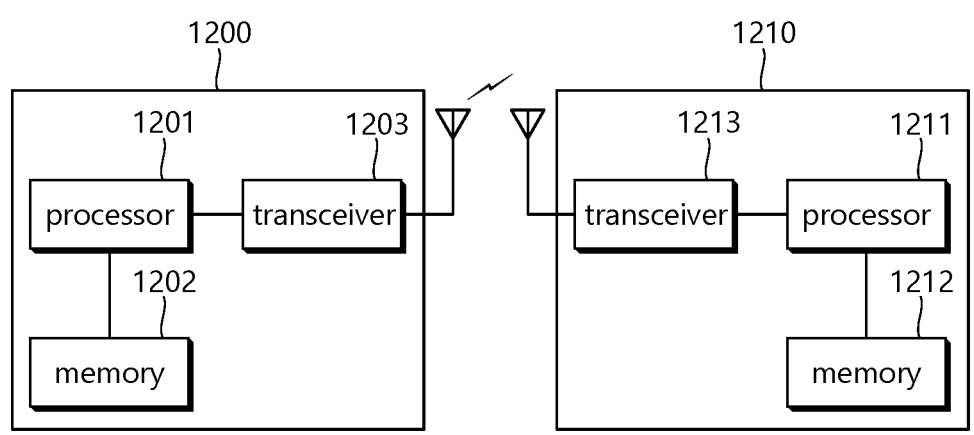
FIG. 12 is a block diagram illustrating a wireless communication system according to the embodiment of the present invention.

FIG. 12 is a block diagram illustrating a wireless communication system according to the embodiment of the present invention.

ABS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of performing, by a user equipment (UE), an access attempt to a cell in a wireless communication system, the method comprising:
   determining a type of access based on a request to access the cell;
   determining an access category for the request based on the type of access;
   performing an access barring check for the cell;
   mapping the access category to an establishment cause based on a mapping table configured for the UE; and
   based on access to the cell not being barred for the request, transmitting, to a base station of the cell, a message requesting establishment of a radio resource control (RRC) connection, the message comprising the establishment cause mapped from the access category.

2. The method of claim 1, wherein determining the type of access comprises:
   determining the type of access as related to a type of service or call for the request to access the cell.

3. The method of claim 1, wherein determining the access category for the request comprises:
   determining the access category as an integer value.

4. The method of claim 1, wherein the establishment cause is related to at least one of mobile-originated (MO) signaling or an emergency signaling.

5. The method of claim 1, wherein determining the access category for the request based on the type of access comprises:
   determining the access category based on an application that triggers the request to access the cell.

6. The method of claim 1, wherein determining the access category for the request based on the type of access further comprises:
   determining the access category based on at least one of a type of service or a type of call for the request to access the cell.

7. The method of claim 6, wherein the type of service is at least one of a voice service, a video service, or a short message service (SMS).

8. The method of claim 6, wherein the type of call is at least one of an emergency call or a high priority call.

9. The method of claim 1, wherein determining the access category for the request based on the type of access further comprises:
   determining the access category based on a configuration of the UE.

10. The method of claim 9, wherein the configuration of the UE relates to a priority level of the UE.

11. The method of claim 1, wherein determining the access category for the request based on the type of access further comprises:
    determining the access category based on a signaling procedure related to at least one of a non-access stratum (NAS) layer of the UE or an RRC layer of the UE.

12. The method of claim 1, wherein the mapping table is pre-configured by the UE.

13. The method of claim 1, further comprising:
    receiving the mapping table from the base station.

14. The method of claim 1, further comprising:
    providing the access category from a non-access stratum (NAS) layer of the UE to an RRC layer of the UE.

15. The method of claim 1, further comprising:
    providing the establishment cause from a non-access stratum (NAS) layer of the UE to an RRC layer of the UE.

16. The method of claim 1, further comprising:
    receiving, from the base station, barring information that comprises at least one of a barring factor, a barring time, or a bitmap.

17. A user equipment (UE) configured to perform an access attempt to a cell in a wireless communication system, the UE comprising:
    a transceiver;
    at least one processor; and
    at least one computer memory operably connectable to the at least one processor and storing instructions that, when executed, cause the at least one processor to perform operations comprising:
    determining a type of access based on a request to access the cell;
    determining an access category for the request based on the type of access;
    performing an access barring check for the cell;
    mapping the access category to an establishment cause based on a mapping table configured for the UE; and
    based on access to the cell not being barred for the request, transmitting, to a base station of the cell, a message requesting establishment of a radio resource control (RRC) connection, the message comprising the establishment cause mapped from the access category.

* * * * *